United States Patent
Fruchtman et al.

(10) Patent No.: US 7,539,735 B2
(45) Date of Patent: May 26, 2009

(54) MULTI-SESSION NO QUERY RESTORE

(75) Inventors: Barry Fruchtman, Tucson, AZ (US); Omar Bond Vargas, Daytona Beach, FL (US); Robert Clair Edwards, Jr., Susquehanna, PA (US)

(73) Assignee: International Business Machines Corporation, Armonk, NY (US)

( * ) Notice: Subject to any disclaimer, the term of this patent is extended or adjusted under 35 U.S.C. 154(b) by 832 days.

(21) Appl. No.: 10/091,797

(22) Filed: Mar. 6, 2002

(65) Prior Publication Data

US 2003/0172130 A1    Sep. 11, 2003

(51) Int. Cl.
*G06F 15/167* (2006.01)
*G06F 12/00* (2006.01)
*G06F 15/173* (2006.01)

(52) U.S. Cl. ............... 709/216; 707/204; 711/164; 711/162; 709/214; 709/223

(58) Field of Classification Search ........... 709/201, 709/211, 212, 213, 216, 214, 223; 707/204, 707/8, 10, 202, 206; 711/163, 114, 161–164, 711/150–151; 710/200–241
See application file for complete search history.

(56) References Cited

U.S. PATENT DOCUMENTS

| | | | |
|---|---|---|---|
| 5,426,421 A | | 6/1995 | Gray .................. 340/825.15 |
| 5,535,381 A | * | 7/1996 | Kopper .................. 710/52 |
| 5,765,173 A | * | 6/1998 | Cane et al. .................. 707/204 |
| 5,806,075 A | * | 9/1998 | Jain et al. .................. 707/201 |
| 6,038,379 A | * | 3/2000 | Fletcher et al. ............. 709/230 |
| 6,067,636 A | * | 5/2000 | Yao et al. .................. 714/15 |

(Continued)

FOREIGN PATENT DOCUMENTS

| | | |
|---|---|---|
| JP | 1-133168 | 5/1989 |
| JP | 11-194965 | 7/1999 |

OTHER PUBLICATIONS

"Backup without disuption: LAN-free, server-free SAN backup voids disrupting business", by Derek Gamradt, issued on May 1, http://www.serverworldmagazine.com/monthly/2001/05/backup.shtml.*

(Continued)

*Primary Examiner*—Ario Etienne
*Assistant Examiner*—Gregory G Todd
(74) *Attorney, Agent, or Firm*—Kunzler & McKenzie

(57) ABSTRACT

A method of restoring data in a computer network system wherein a plurality of client systems have access to a storage pool coupled to an associated storage area network (SAN) includes: requesting a restore wherein each of the plurality of client systems may participate in the restore; and coordinating access to the data stored in the storage pool by tracking a plurality of data portions of the data to be restored and by blocking access to each of the plurality of data portions that have been restored by one of the plurality of client systems to avoid duplicative restoration efforts. A master restore table may also be constructed to assist with coordinating access to the stored data. A computer network system configured to coordinate a restore request where a plurality of client systems may participate in the restore is also provided.

18 Claims, 4 Drawing Sheets

U.S. PATENT DOCUMENTS

| | | | |
|---|---|---|---|
| 6,148,412 A * | 11/2000 | Cannon et al. | 714/6 |
| 6,205,527 B1 | 3/2001 | Goshey et al. | 711/162 |
| 6,411,969 B1 * | 6/2002 | Tam | 707/204 |
| 6,415,280 B1 * | 7/2002 | Farber et al. | 707/2 |
| 6,542,906 B2 * | 4/2003 | Korn | 707/203 |
| 6,564,215 B1 * | 5/2003 | Hsiao et al. | 707/8 |
| 6,611,923 B1 * | 8/2003 | Mutalik et al. | 714/4 |
| 6,714,952 B2 * | 3/2004 | Dunham et al. | 707/204 |
| 6,718,352 B1 * | 4/2004 | Dang et al. | 707/205 |
| 6,721,766 B1 * | 4/2004 | Gill et al. | 707/204 |
| 6,728,721 B1 * | 4/2004 | Sturms | 707/101 |
| 6,850,955 B2 * | 2/2005 | Sonoda et al. | 707/200 |
| 6,985,719 B2 * | 1/2006 | Leppinen et al. | 455/412.1 |
| 7,069,295 B2 * | 6/2006 | Sutherland et al. | 709/203 |
| 7,152,078 B2 * | 12/2006 | Yamagami | 707/204 |
| 7,243,103 B2 * | 7/2007 | Murphy et al. | 707/10 |
| 2002/0144069 A1 * | 10/2002 | Arakawa et al. | 711/162 |
| 2003/0018657 A1 * | 1/2003 | Monday | 707/204 |
| 2003/0105716 A1 * | 6/2003 | Sutton et al. | 705/50 |

OTHER PUBLICATIONS

"Model and Verification of a Data Manager Based on ARIES", by Dean Kuo, from ACM Transactions on Database Systems, vol. 21, No. 4, Dec. 1996, pp. 427-479.

\* cited by examiner

MASTER RESTORE TABLE

| Portions of data to be restored | Location in Storage Media | LAN-free Path | Server-free Path | Storage Media |
|---|---|---|---|---|
| portion 1<br>" 2<br>" 3 | media a, location 1<br>" a, " 2<br>" a, " 3 | | | |
| " 4<br>" 5<br>" 6<br>" 7 | media b, location 1<br>. . . | | | |
| " 8<br>" 9<br>" 10 . . . | | | | |

202 — Portions of data to be restored
204 — Location in Storage Media
206 — LAN-free Path
208 — Server-free Path
210 — Storage Media 215 — first sub-table
217 — second sub-table
219 — third sub-table

MULTI-SESSION NO QUERY RESTORE

FIELD OF THE INVENTION

This invention relates to data restoration, and in particular to coordinated data restoration in a computer network system in which a plurality of client systems may participate in the same restore.

BACKGROUND OF THE INVENTION

Data is the underlying resource on which all computing processes are based. The volume of this data is ever increasing in various business applications, and each bit of data may be critical to business functions. In dealing with such data, many businesses arrange their personal computers (PCs) in a client/server network. The PCs and any associated programs typically function as the client in that it requests files or services. A server, which may be anything from another PC to a mainframe, handles the request from the client and supplies the requested data or service to the client. Such client/server networks may communicate with each other over an associated local area network (LAN).

To address the volume and importance of storing such data on client/server networks, storage area networks (SANs) have emerged to free up bandwidth on such LANs and to provide storage and related storage services to clients of one or more client systems such as backup and restoration functions. A SAN is a dedicated network separate from LANs and wide area networks (WANs) which interconnects storage devices to one or more servers and to a plurality of clients and/or client systems in a related network.

Storage devices are a place to keep and retrieve data on a long-term basis. Each storage device includes some storage medium which physically stores the data such magnetic tape, optical disks, hard disks, and floppy disks. Storage media can also be arranged in a variety of ways including a redundant array of independent or inexpensive disks (RAIDs) which typically function as one of the storage devices in a SAN.

SANs also often have high interconnect data rates (gigabits/second) between member storage devices and are highly scalable. SANs can be interconnected with similar elements as in LANs and WANs, e.g., routers, hubs, switches, and gateways. A SAN may be local or extend over geographic distances.

A storage management server or servers may also be utilized to control the storage devices and keep track of the data that the plurality of clients have stored on the plurality of storage devices coupled to a common SAN. The storage management server may also be utilized in data restoration efforts. Data restoration permits clients to copy a version of a backup file or files stored on any one of the plurality of storage devices.

However, such data restoration efforts typically require manual restoration and partitioning and do not permit a plurality of client systems to automatically participate in the same restore effort. Accordingly, there is a need in the art for a system and method for optimizing data restoration in a SAN environment where multiple client systems may be involved in a single restore which allows for coordinated access to an associated storage pool of data.

BRIEF SUMMARY OF THE INVENTION

A method of restoring data in a computer network system wherein a plurality of client systems have access to a storage pool coupled to an associated storage area network (SAN) consistent with the invention includes: requesting a restore wherein each of the plurality of client systems may participate in the restore; and coordinating access to the data stored in the storage pool by tracking a plurality of data portions of the data to be restored and by blocking access to each of the plurality of data portions that have been restored by one of the plurality of client systems to avoid duplicative restoration efforts.

A computer network system for restoring data consistent with the invention includes: a a plurality of client systems; a storage pool coupled to the plurality of client systems through a storage area network (SAN); and a storage management server coupled to the plurality of client systems through the SAN, wherein the storage management server is configured to coordinate access to the data stored in the storage pool by tracking a plurality of data portions of the data to be restored and by blocking access to each of the plurality of data portions that have been restored by one of the plurality of client systems to avoid duplicative restoration efforts.

BRIEF DESCRIPTION OF THE DRAWINGS

For a better understanding of the present invention, together with other objects, features and advantages, reference should be made to the following detailed description which should be read in conjunction with the following figures wherein like numerals represent like parts:

FIG. 2 is an exemplary master restore table consistent with the present invention;

DETAILED DESCRIPTION

Figure 1:
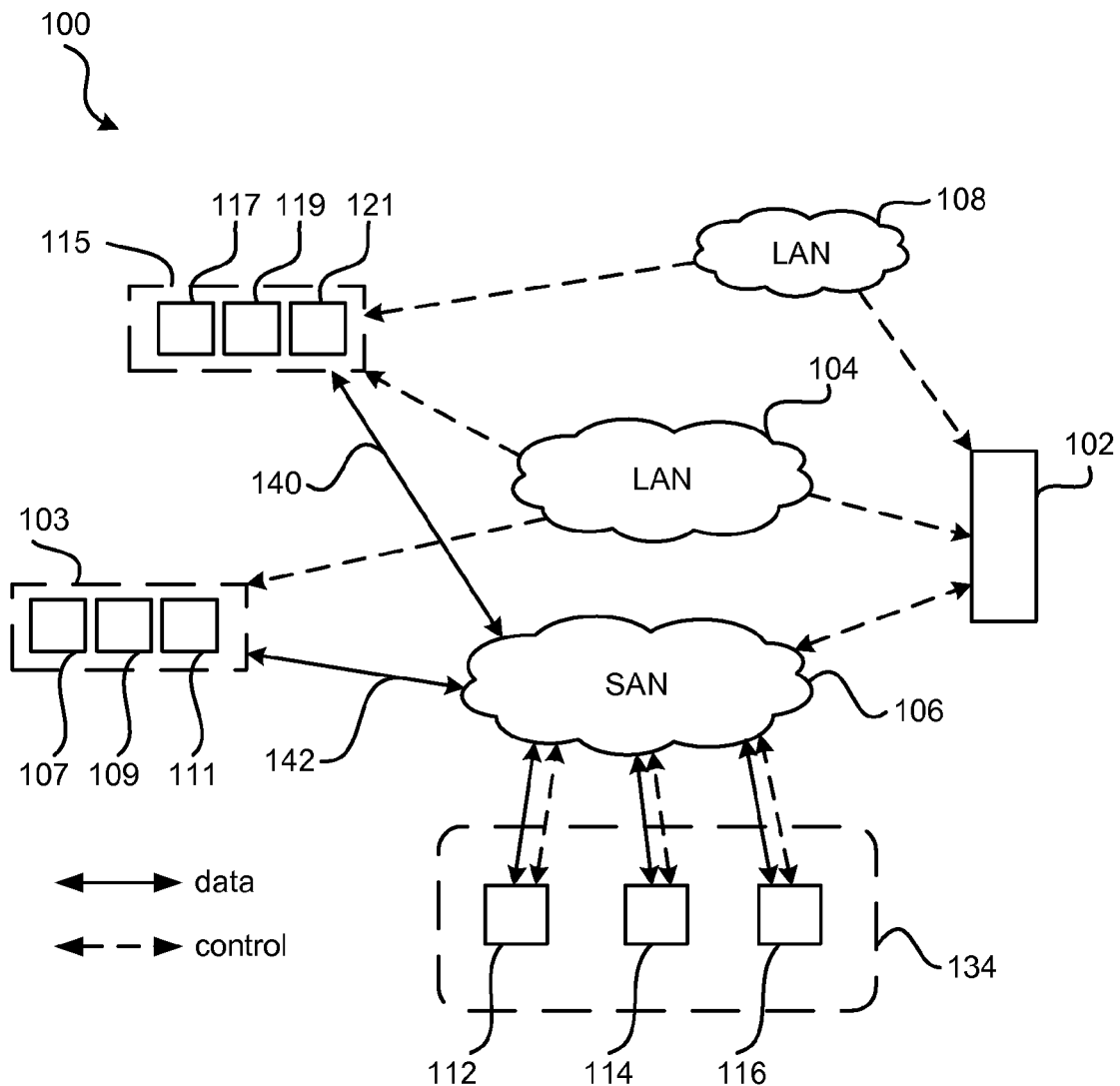
FIG. 1 is a block diagram of a computer network system including a plurality of client systems with access to a storage pool of a SAN.

Turning to FIG. 1, a block diagram of a computer network system 100 including a storage management server 102 configured to create and store a master restore table consistent with the present invention is illustrated. The computer network system 100 may contain a plurality of client systems 103, 115. Although only two client systems 103, 115 are illustrated for clarity, those skilled in the art will recognize that a computer network system 100 consistent with the invention may contain any number of client systems.

Each client system may contain a plurality of clients. For instance, a first client system 103 may contain its associated plurality of clients 107, 109, 111 and a second client system 115 may similarly contain its associated plurality of clients 117, 119, 121. Each client may be a PC or software on such PCs. Clients in each client system 103, 115 are coupled directly to each other in any number of fashions known to those skilled in the art, but are not coupled directly to other clients in other client systems. In addition, those skilled in the art will recognize any number of clients may be present in a computer network system 100 consistent with the invention.

One or more of the clients 107, 109, 111 or 117, 119, 121 may be equipped with storage software, e.g., a storage agent, enabling the client with such software to communicate data to be stored in associated storage pool 134 directly over the SAN 106. The storage pool 134 includes a plurality of storage devices 112, 114, 116. Any number of such storage devices 112, 114, 116 may be present in a computer network system 100 consistent with the invention. Each storage device 112, 114, 116 includes some storage medium which physically stores the data such magnetic tape, optical disks, hard disks, floppy disks, or the like.

Such data transfers between client systems 103, 115 and the storage pool 134 normally occur without moving data through the LAN 104, the LAN 108, or the storage management server 102. Accordingly, LAN communication bandwidth can be freed up for a variety of uses and a corresponding decreased load on the storage management server 102 allows it to support a greater number of simultaneous client connections.

The client systems 103, 115 may continue to use the LAN 104 or 108 connections to the storage management server 102 to exchange control information over the LAN 104 or 108 to the server 102, such as policy information and data about the objects that are backed up. If a failure occurs and data cannot be transferred from the client systems 103, 115 over the SAN 106 to the storage pool 134, then the client systems 103, 115 may use an alternate path via the LAN 104 or LAN 108 to make such a connection.

Advantageously, the computer network system 100 may have a storage management server 102 configured to construct a master restore table consistent with the invention to optimize data restore efforts among a plurality of client systems 103, 115. As data from each client of each client system 103, 115 is backed up and stored in one or more storage devices 112, 114, 116 of the storage pool 134, the storage management server 102 receives control information indicating the stored location of object data.

Figure 3:
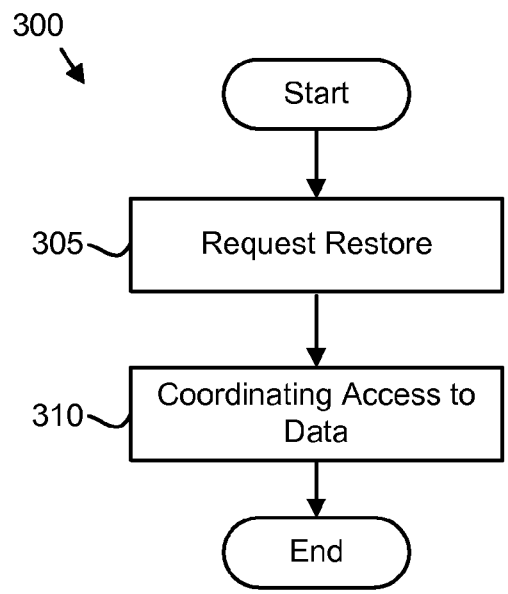
FIG. 3 is a schematic flow chart diagram illustrating one embodiment of a method of restoring data of the present invention.
Figure 4:
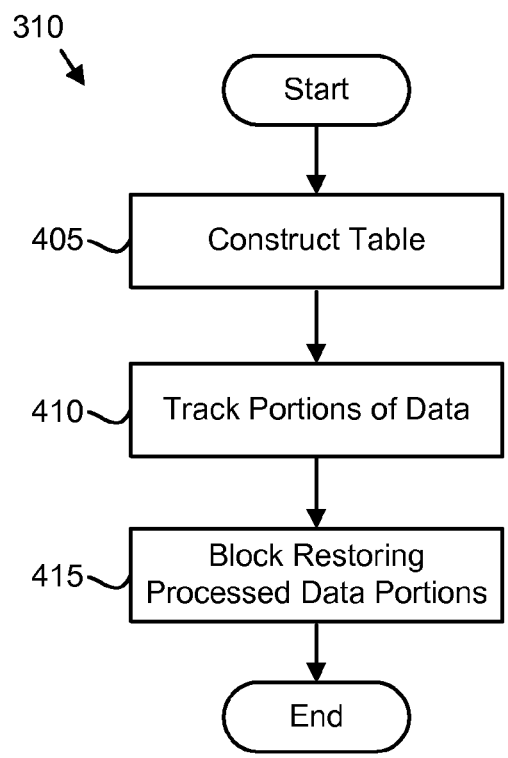
FIG. 4 is a schematic flow chart diagram illustrating one embodiment of a method of coordinating access to stored data of the present invention.

Also referencing FIGS. 3 and 4, when a client having appropriate storage software from a client system 103, 115 requests 305 a restore, the server 102 constructs 405 a master restore table associated with that particular restore request. In general, the master restore table includes portions of data to be restored and an associated location of those portions of data in the storage pool 134. As the master restore table is being constructed 405, data restoration efforts may begin without waiting for the table to be completed.

Advantageously, as described more fully below with reference to FIG. 2, and with reference to FIG. 3, clients 107, 109, 111 and 117, 119, 121 of a plurality of client systems 103, 115 may participate in a restore effort by utilizing a master restore table to coordinate 310 access to data stored in the storage pool 134 such that duplicative restoration efforts from a plurality of client systems 103, 115 can be avoided.

Turning to FIG. 2 and with reference to FIG. 4, an exemplary master restore table 200 consistent with the invention that may be created and temporarily stored in a storage management server 102 or any device common to the system 100 is illustrated. The table 200 generally is used to track 410 portions of data to be restored and the associated restore media from the various storage devices 112, 114, 116 of the storage pool 134 where such portions of data are located. A host of clients 107, 109, 111 and 117, 119, 121 and client systems 103, 115 may be able to access the table 200 to optimize restore efforts from a plurality of client systems 103, 115. Although described in terms of columns and rows, a master restore table consistent with the invention may take a variety of forms.

The master restore table 200 may include a plurality of columns including: a first column 202 detailing the portions of data to be restored; a second column 204 detailing the location of such portions of data on associated media from various storage devices 112, 114, 116 of the storage pool 134; a third column 206 detailing a LAN-free path 140, 142 for accessing the associated storage media if such path exists, a fourth column 208 detailing a server-free path 140, 142 for accessing the associated storage media if such path exists, and a fifth column 210 detailing the status of whether an associated storage media has been processed for a given portion of data. Advantageously then, the fifth column tracks 410 the portions of data that have been processed by any one client in any one plurality of client systems 103, 115. In this way, clients or restore processes from any client system 103, 115 would be blocked 415 from restoring a portion of that data that had already been processed or restored. Accordingly, duplicative restoration efforts are automatically avoided.

In addition, the portions of data may be automatically partitioned into a plurality of sub-tables, e.g., a first-sub-table 215, a second sub-table 217, and a third sub-table 219 are illustrated although any number of sub-tables may be necessary depending on the volume and location of the objects to be restored. Advantageously, the partitioning of the portions of data into the various sub-tables 215, 217, 219 occurs automatically, and the partitioning may be based on predetermined criteria such as the location of the portions of data on associated storage devices 112, 114, 116 in the storage pool 134. In addition, restoration of objects in the first sub-table 215 may occur as future sub-tables are still being constructed. The table 200 also permits a restore to continue after it has been interrupted since the fifth column 210 keeps track of which objects have been processed for the restore.

The master restoration table also coordinates restoration of a plurality of data portions concurrently from a plurality of storage devices 112, 114, 116 in order to efficiently restore lost data. Data to be restored may be provided to a target restoration device, which may be any device, e.g., a common server, which is accessible to the plurality of client systems 103, 114.

Restoration may also take place during one or a plurality of sessions. A session is a period of time in which a user or client can communicate with an associated server, e.g., the storage management server 102, to perform a backup, archive, or restore request. In this way, restoration software in one or more concurrent sessions from one or more client systems 103, 115 can be run in order to optimize a restoration effort.

Figure 5:
FIG. 5 is a data diagram illustrating one embodiment of a token of the present invention.

Clients 107, 109, 111 or 117, 119, 121 with appropriate storage software may gain access to the restore table 200 by means of a restore token 500 as shown as a prophetic example in FIG. 5, e.g., a predetermined sequence of bits, which uniquely identifies the table that the server has built for a particular restore effort. In addition, each client 107, 109, 111 or 117, 119, 121 may gain access the restore table multiple times simultaneously. When the restore effort for a particular particular restore request is complete, the original initiating client communicates with the storage management server 102 to delete the master restore table. The token 500 may then be available for other clients to use.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A method of restoring data in a computer network system wherein a plurality of client systems have access to a storage pool coupled to an associated storage area network (SAN) comprising the steps of:

requesting a restore wherein each of said plurality of client systems participate in said restore; and coordinating restoration of data stored in said storage pool by said plurality of client systems over a plurality of sessions using a storage management server that constructs a master restore table comprising a plurality of data portions to be restored, an associated location of said plurality of data portions in said storage pool, and a status of whether an associated storage media for a data portion has been restored, wherein said master restore table is partitioned into a plurality of sub-tables based on the locations of data portions and is identified by an associated token and a client system participating in a restore gains access to said master restore table by use of said token, tracks said plurality of data portions of said data as restored by said plurality of client systems using the status, and blocks access by said client systems to each of said plurality of data portions that have been restored by one of said plurality of client systems in response to a processed restoration status to avoid duplicative restoration efforts, wherein the plurality of client systems restore data portions to a single client.

2. The method of claim 1, wherein said coordinating access step occurs during a plurality of sessions.

3. The method of claim 1, wherein said coordinating access step is interruptible.

4. The method of claim 1, wherein said storage pool comprises a plurality of storage devices and said associated location of said data portions includes a location in one of said storage devices.

5. The method of claim 4, wherein said data portions are provided concurrently from said plurality of storage devices to a target restoration device accessible by said plurality of client systems.

6. The method of claim 1, wherein said master restore table further comprises data representative of a LAN-free path or a server-free path from a client to said storage pool.

7. The method of claim 1, further comprising the step of deleting said master restore table after restoration of a target restoration device is complete and returning said token to said client system.

8. The method of claim 1, wherein said constructing step further comprises automatically partitioning said plurality of data portions in said master restore table based on said associated location of said plurality of data portions in said storage pool.

9. The method of claim 1, wherein said coordinating access step occurs before said master restore table is fully constructed.

10. The method of claim 1, wherein said master restore table is saved in a storage management server, said storage management server coupled to said SAN.

11. The method of claim 1, wherein the associated token comprises a sequence of bits that uniquely identifies the master restore table for a particular restore effort.

12. A computer network system for restoring data comprising:

a plurality of client systems;

a storage pool coupled to said plurality of client systems through a SAN; and a storage management server coupled to said plurality of client systems through said SAN, wherein said storage management server is configured to coordinate restoration of data stored in said storage pool by said plurality of client systems over a plurality of sessions by constructing a master restore table comprising a plurality of data portions to be restored, an associated location of said plurality of data portions in said storage pool, and a status of whether an associated storage media for a data portion has been restored, wherein said master restore table is partitioned into a plurality of sub-tables based on the locations of data portions and is identified by an associated token and a client system participating in a restore gains access to said master restore table by use of said token, tracking said plurality of data portions of said data as restored by said plurality of client systems using the status, and blocking access by said client systems to each of said plurality of data portions that have been restored by one of said plurality of client systems in response to a processed restoration status to avoid duplicative restoration efforts, wherein the plurality of client systems restore data portions to a single client.

13. The system of claim 12, wherein said storage pool comprises a plurality of storage devices and said associated location of said data portions includes a location in one of said plurality of storage devices.

14. The system of claim 13, wherein said data portions are provided concurrently from said plurality of storage devices to a target restoration device accessible by said plurality of client systems.

15. The system of claim 12, wherein said master restore table further comprises data representative of a LAN-free path or a server-free path from a client to said storage pool.

16. The system of claim 12, wherein an initiating client instructs deletion of said master restore table after restoration of a target restoration device is complete.

17. The system of claim 12, wherein said master restore table is configured to automatically partition said plurality of data portions based on said associated location of said plurality of data portions in said storage pool.

18. The system of claim 12, wherein the associated token comprises a sequence of bits that uniquely identifies the master restore table for a particular restore effort.

* * * * *